United States Patent Office 3,291,805
Patented Dec. 13, 1966

3,291,805
METHOD FOR THE PRODUCTION OF HYDROXY-PICOLINIC ACID
Miguel A. Ondetti, Highland Park, and John T. Sheehan, Middlesex, N.J., assignors, by mesne assignments, to E. R. Squibb & Sons, Inc., New York, N.Y., a corporation of Delaware
No Drawing. Filed Jan. 28, 1965, Ser. No. 428,873
1 Claim. (Cl. 260—297)

This invention relates to a method for the production of hydroxypicolinic acid. More particularly, the invention relates to a method for the production of 3-hydroxy-picolinic acid and to novel intermediates therefor.

3-hydroxypicolinic acid and acid salts thereof, e.g., hydrohalides such as the hydrochloride, hydrobromide, etc. are known compounds which have topical activity against *T. vaginalis* and are also useful as intermediates for the synthesis of various organic compounds used particularly in the pharmaceutical field, e.g. in the synthesis of antibiotics such as osteogreisin, vernamycin and ethamycin. They have previously been obtained only in small yield. According to the present invention, which comprises synthesizing the product by way of the novel 3-benzyloxy-picolinic acid or acid salt thereof, the 3-hydroxypicolinic acid or salt is more easily formed and in more copious yield.

The present invention comprises forming 3-benzyloxy-picolinic acid or an acid salt thereof, e.g., a hydrohalide like the hydrochloride by oxidizing 2-hydroxymethyl-3-benzyloxypyridine, e.g., with a permanganate such as potassium permanganate, sodium permanganate, etc., or alternatively in two steps using selenium dioxide and hydrogen peroxide or dimethyl sulfoxide and hydrogen peroxide or similar oxidizing agents, (and, if desired, reacting with a strong inorganic acid, e.g., a hydrohalic acid, if the acid salt is desired), then reducing the product thus formed, e.g., catalytically.

The oxidation of 2-hydroxymethyl-3-benzyloxypyridine may be effected in aqueous medium at about room temperature or higher, e.g., up to about 100° C., preferably at about 80° C.

The 3-benzyloxypicolinic acid is readily purified by forming the acid salts, e.g., by reacting the former in alcoholic solution with an acid such as a hydrohalic acid or other mineral acid such as sulfuric acid, nitric acid, etc., or with alkylsulfonic or arylsulfonic acids such as methanesulfonic acid, benzenesulfonic or the like. The salt then may be used in the succeeding reduction step.

The reduction of the 3-benzyloxypicolinic acid or its salt is preferably effected catalytically, e.g., in aqueous solution with hydrogen in the presence of palladium-carbon, but platinum group metals may also be used. Generally, ambient temperatures may be used.

When the acid salt is obtained, it may be converted to the free acid, e.g., by forming the copper salt upon reaction with a copper compound such as cupric acetate, then treating the copper salt with hydrogen sulfide.

The following example is illustrative of the invention. All temperatures are in degrees centigrade.

EXAMPLE

*2-hydroxymethyl-3-benzyloxypyridine*

To a solution of 32 g. (0.2 mole) of 2-hydroxymethyl-3-hydroxypyridine hydrochloride in 100 ml. of water, a solution of 26 g. of potassium hydroxide in 100 ml. of water containing 0.5 g. potassium iodide is added. The temperature is kept below 30° C. by external cooling and by controlling the rate of addition. To this solution, 300 ml. of methanol and 32 ml. of benzyl chloride are added, and the entire mixture stirred at room temperature in a closed vessel for 72 hours. After this period, the insoluble salt formed is filtered off and washed with methanol. The filtrate and washings are combined and concentrated in vacuo at a bath temperature of 30–35°. As all of the methanol is removed, the product separates and is filtered off. On standing, some additional product separates. The crude product weighs about 25 g. (60% yield), M.P. 73–75°. It is purified by dissolving in about 200 ml. normal hydrochloric acid; and after the acid solution has been extracted three times with 50 ml. of chloroform, the acid solution is, while cooling, made alkaline with 20% potassium hydroxide solution. The crystalline product is filtered off and washed with water.

If additional purification is required, the product is either distilled in good vacuum or crystallized from hexane or water. The product obtained under these conditions is a white, crystalline material with M.P. 81–82°; $R_f = 0.81$ in butanol-acetic acid-water system (4:1:5); U.V. spectrum shows $$E^{1\%}_{1\,cm.} = 328 \text{ at } 278 \text{ m}\mu$$

and $$E^{1\%}_{1\,cm.} = 907 \text{ at } 218 \text{ m}\mu$$

I.R. spectrum, a substituted phenyl band at 13.6 and 13.25μ.

*Analysis.*—Calc. for $C_{13}H_{13}NO_2$: C, 72.54; H, 6.09; N, 6.51. Found: C, 72.59; H, 6.12; N, 6.49.

*3-benzyloxypicolinic acid hydrochloride sesquihydrate*

To a stirred suspension of 14.5 g. (0.067 mole) of 2-hydroxymethyl-3-benzyloxypyridine in 350 ml. of water, 7.7 g. (0.049 mole) of potassium permanganate is added, and the mixture is heated to about 80° for one hour. After this period, a second portion of 7.7 g. of potassium permanganate and 150 ml. of water is added, and the heating and stirring continued for two hours at 75–85°. The reaction mixture is allowed to cool slightly and the manganese dioxide removed by gravity filtration and then washed with about 200 ml. of hot water. The combined filtrate and washings are then extracted three times with 100 ml. portions of chloroform and these extracts discarded. The aqueous mother liquor is acidified with 200 ml. concentrated hydrochloric acid and allowed to stand overnight in the cold (5°). The product which separates is filtered off and sucked dry. After air-drying, it weighs 15.5 g. (80%) and is essentially pure.

The product is further purified by dissolving in 100 ml. of methanol containing 5 ml. of N alcoholic hydrogen chloride. On dilution with 200 ml. of ethyl acetate, the product separates in crystalline form. The crystals are filtered off and washed with ethyl acetate and allowed to air-dry. The yield of product is 11 g. (about 60%). This yield is increased by working up the mother liquors. The product melts at 108–112°. Chromatographed on paper in n-butanol-acetic acid-water (4:1:5), it shows an U.V. spot ($R_f = 0.86$) which can also be revealed with bromophenol blue spray. The U.V. spectrum shows $$E^{1\%}_{1\,cm.} = 140 \text{ at } 288 \text{ m}\mu$$

and $$E^{1\%}_{1\,cm.} = 429 \text{ at } 217 \text{ m}\mu$$

In the I.R. spectrum, a carbonyl band is found at 5.85 and monosubstituted benzene bands at 13 and 13.5μ.

*Analysis.*—Calc. for $C_{13}H_{11}NO_3HCl \cdot 1\frac{1}{2}HO$: C, 53.34; H, 5.17; N, 4.79; Cl, 12.11. Found: C, 53.20; H, 5.32; N, 4.77; Cl, 12.27.

*3-hydroxypicolinic acid*

A solution of 6.0 g. (0.02 mole) of 3-benzyloxypicolinic acid hydrochloride sesquihydrate in 200 ml. of 50% ethinol is hydrogenated at room temperature under atmospheric pressure in the presence of 0.5 g. of 5% palladium on charcoal for five hours. The catalyst is removed by filtration and washed with a little water, then the original filtrate and washings are combined and evaporated in vacuo at about 30°. The residue (3.2 g.) is taken up in 100 ml. of methanol and filtered. To the filtrate, 1 ml. of 5 N ethanolic hydrogen chloride and 200 ml. of ethyl acetate are added and the mixture allowed to stand overnight in the cold (5°). The product 3-hydroxypicolinic acid hydrochloride, which separates is filtered off and air-dried. It weighs 2.8 g. (77%), M.P. 220–222°, with decomposition. Chromatographed on paper in n-butanol-acetic acid-water, it gives a strongly fluorescent spot seen in ultraviolet light ($R_f=0.47$). This spot turns brownish on spraying with ferric chloride solution. The U.V. spectrum shows $$E_{1\,cm.}^{1\%}=443 \text{ at } 304 \text{ m}\mu$$

and $$E_{1\,cm.}^{1\%}=418 \text{ at } 224 \text{ m}\mu$$

while the I.R. spectrum has a carbonyl band at $5.85\mu$ and no benzene bands.

*Analysis.*—Calc. for $C_6H_5NO_3 \cdot HCl$: C, 41.04; H, 3.45; N, 7.98; Cl, 20.20. Found: C, 41.29; H, 3.59; N, 7.94; Cl, 20.23.

The hydrochloride is converted into 3-hydroxypicolinic acid by forming the copper salt with cupric acetate and then treating an aqueous suspension of the latter with hydrogen sulfide to remove the copper. The free hydroxypicolinic acid is recovered from the filtrate by evaporation. If necessary, a second purification via the copper salt may be employed. The free acid crystallizes from water, acetone or hexane and melts with decomposition at about 205° C.

What is claimed is:
2-hydroxymethyl-3-benzyloxypyridine.

References Cited by the Examiner

Noller: Chemistry of Organic Compounds, Saunders (1957), p. 172.

Wagner-Zook: Synthetic Organic Chemistry, Wiley (1953), p. 172.

Endo et al.: (Nat'l. Hyg. Lab., Osaka, Japan), Yakugaku Zasshi, 80, pp. 875–9 (1960) (abstracted from C. A., vol. 54, par. 24705d).

Clark-Lewis: (UN. v. Adelaide, S. Australia), J. Chem. Soc., 1961, pp. 189–201 (abstracted from C. A., volume 55, par. 11410d).

WALTER A. MODANCE, *Primary Examiner.*

A. L. ROTMAN, *Assistant Examiner.*